(12) United States Patent
Nyman et al.

(10) Patent No.: US 12,398,517 B2
(45) Date of Patent: Aug. 26, 2025

(54) USE OF A CELLULOSE DERIVATIVE AND METHOD FOR SURFACE SIZING

(71) Applicant: Kemira Oyj, Helsinki (FI)

(72) Inventors: Ville Nyman, Espoo (FI); Anneli Lepo, Espoo (FI)

(73) Assignee: Kemira Oyj, Helsinki (FI)

( * ) Notice: Subject to any disclaimer, the term of this patent is extended or adjusted under 35 U.S.C. 154(b) by 121 days.

(21) Appl. No.: 17/905,400

(22) PCT Filed: Mar. 4, 2021

(86) PCT No.: PCT/FI2021/050157
§ 371 (c)(1),
(2) Date: Aug. 31, 2022

(87) PCT Pub. No.: WO2021/176144
PCT Pub. Date: Sep. 10, 2021

(65) Prior Publication Data
US 2023/0122933 A1   Apr. 20, 2023

(30) Foreign Application Priority Data

Mar. 4, 2020   (FI) ..................................... 20205228

(51) Int. Cl.
*D21H 21/16*   (2006.01)
*B32B 29/00*   (2006.01)
(Continued)

(52) U.S. Cl.
CPC ........... *D21H 21/16* (2013.01); *B32B 29/005* (2013.01); *B32B 29/08* (2013.01); *D21H 11/14* (2013.01);
(Continued)

(58) Field of Classification Search
CPC .............................. D21H 21/16; D21H 23/22
See application file for complete search history.

(56) References Cited

U.S. PATENT DOCUMENTS 2,184,312 A   12/1939   Merrill
6,123,760 A    9/2000   Varnell
(Continued)

FOREIGN PATENT DOCUMENTS

CN   104562845 A    4/2015
CN   105200855 A   12/2015
(Continued)

OTHER PUBLICATIONS

NIH National Library of Medicine, Hydroxyethyl cellulose, Jul. 11, 2008, PubChem, url: https://pubchem.ncbi.nlm.nih.gov/compound/Hydroxyethyl-cellulose (Year: 2008).*
(Continued)

*Primary Examiner* — Jacob T Minskey
*Assistant Examiner* — Elisa H Vera
(74) *Attorney, Agent, or Firm* — Meunier Carlin & Curfman LLC

(57) ABSTRACT

The invention relates to the use of a surface size composition comprising at least one cellulose derivative selected from cellulose ethers, excluding carboxyalkyl celluloses, for providing compression strength for a fibrous web, such as paper, board or the like, preferably comprising recycled cellulosic fibres. The invention relates also to a method for surface sizing of paper, board or the like.

11 Claims, 2 Drawing Sheets

(51) Int. Cl.
  *B32B 29/08*   (2006.01)
  *D21H 11/14*   (2006.01)
  *D21H 17/26*   (2006.01)
  *D21H 17/28*   (2006.01)
  *D21H 23/22*   (2006.01)
  *D21H 27/30*   (2006.01)

(52) U.S. Cl.
  CPC ............. *D21H 17/26* (2013.01); *D21H 17/28* (2013.01); *D21H 23/22* (2013.01); *D21H 27/30* (2013.01); *B32B 2250/26* (2013.01); *B32B 2255/12* (2013.01); *B32B 2255/24* (2013.01); *B32B 2307/718* (2013.01)

(56) References Cited

U.S. PATENT DOCUMENTS

| | | | |
|---|---|---|---|
| 2006/0089427 A1 | 4/2006 | Yamamoto et al. | |
| 2018/0245289 A1* | 8/2018 | Heiskanen | D21H 19/36 |

FOREIGN PATENT DOCUMENTS

| | | |
|---|---|---|
| CN | 102644215 B | 7/2017 |
| CN | 107354803 A | 11/2017 |
| CN | 108263024 A | 7/2018 |
| CN | 109355968 A | 2/2019 |
| CN | 110656542 A | 1/2020 |
| JP | S61205180 A | 9/1986 |
| JP | 2005194386 A | 7/2005 |
| JP | 2017160576 A | 9/2017 |
| RU | 2021412 C1 | 10/1994 |
| WO | 2017046751 A1 | 3/2017 |
| WO | 2019180302 A1 | 9/2019 |

OTHER PUBLICATIONS

International Search Report and Written Opinion, in connection with International Application No. PCT/FI2021/050157, dated May 10, 2021.

Finnish Search Report, in connection with International Application No. PCT/FI2021/050157, dated Sep. 30, 2020.

Vodopivec, J. et al. Leafcasting: The influence of Starch and Methyl Cellulose Sizing on the Properties of Leafcasted Paper. In: Papier-Restaurierung. [online], 2005, vol. 6, No. 3, pp. 30-36, ISSN 1563-2628, [retrieved on Sep. 17, 2020]. pp. 30-36.

Morley, C. Video: Surface sizing with methyl cellulose. [online], Sep. 2, 2014, Whole video, [retrieved on Sep. 16, 2020]. Retrieved from <http://chrismorleydesign.com/cairo-paper/surface-sizing-with-methyl-cellulose/Whole video.

Khwaldia Khaoula: "Physical and Mechanical Properties of Hydroxypropyl Methylcellulose-Coated Paper as Affected by Coating Weight and Coating Composition".

Search report and English translation thereof from National Intellectual Property Administration PRC and English translation thereof in corresponding application CN202180018905X . Dated on Jul. 14, 2023. 6p.

* cited by examiner

USE OF A CELLULOSE DERIVATIVE AND METHOD FOR SURFACE SIZING

FIELD OF THE INVENTION

The present invention relates to a use of at least one cellulose derivative and to a method for surface sizing of fibrous web, such as paper, board or the like, according to the preambles of enclosed independent claims.

BACKGROUND OF THE INVENTION

The emergence of e-commerce has revolutionized both consumer habits and packaging markets in the 21$^{st}$ century. Consequently, the demand for packaging materials has increased drastically. At the same time, concerns about climate change, dwindling fossil oil reserves, and accumulation of plastic in the nature have forced suppliers around the world to continuously seek more sustainable packages to protect and transport their goods.

Board, especially corrugated board, is one of the most used packaging materials in the world due to its low price, light-weight structure, and recyclability. For example, in e-commerce, corrugated board represents as much as 80% of the entire packaging material demand. The use of cellulose-based packaging material, such as board, has traditionally been considered as a sustainable alternative thanks to its renewable origin, recyclability, and already established recycling systems. Furthermore, recycled fibre materials, such as old corrugated containers (OCC) and deinked papers (DIP), are often utilized as raw materials for board. Besides the recyclability and the renewable origin, the fluted three-layered structure of the corrugated board results in an exceptionally high stiffness with reasonably low basis weights. The low weight in turn implies low energy demand during transportation.

Despite the evident advantages, board has also its limitations. One of the major drawbacks of the board is its poor water and moisture resistance. The main building blocks of the board are amphiphilic cellulose-based fibres whose hydrophilic hydroxyl groups impart mechanical strength to the fibres, but, at the same time, make them susceptible to moisture. In single-use cups, food packaging and beverage packaging, for instance, the problem is commonly solved covering the board surface with a protective polyethylene film. In terms of packaging board, e.g. corrugated board, however, the strict requirements for cost efficiency, lightness and recyclability are limiting the utilization of protective films and coatings. Commonly, the only surface treatment that linerboard, i.e. the surface layer of the corrugated board, undergoes in the manufacturing process is the starch-based surface sizing. The starch is applied mainly to enhance the mechanical strength of the board.

For boards used as packaging materials, such as boxes and containers, the compression strength of the board is one of the most important properties, which governs the strength of the packages. When packages are stored and/or transported they are mainly subjected to compressive forces, for example, caused by other packages, when the packages are stacked on top of each other. The reason for compression strength failure is the structural collapse of the board under compressive forces. The mechanisms for compression failure are not yet fully understood; however, they differ from mechanisms for tensile strength failure, where the fibres are torn apart from the structure by pulling forces. Therefore, the compression strength of a board cannot be predicted from its tensile strength properties.

Furthermore, in humid conditions the compression strength of the board may rapidly deteriorate. The hydroxyl groups of starch used in surface sizing are sensitive to the water molecules, causing the decline in the strength properties in moist conditions. Many goods are nowadays produced in countries with humid environmental conditions, e.g. in Southeast Asia, from where they are shipped all over the world. This has increased the need for board with improved compression strength even in humid conditions.

SUMMARY OF THE INVENTION

In view of the above, there is a need to improve the moisture resistance of the fibrous packaging material, such as board, and to enhance its compression strength properties in humid environment.

The object of the present invention is to minimize or even eliminate the disadvantages existing in the prior art.

An object of the present invention is to improve the strength properties of a fibrous web, such as paper, board or the like, such as compression strength, tear strength and/or burst strength, and especially compression strength, even in a humid environment.

A further object of the present invention is to improve the moisture resistance of a fibrous web, such as paper, board or the like, especially the moisture resistance of board, e.g. linerboard.

A yet further object of the present invention is to provide the fibrous web, such as paper, board or the like, with high compression strength, especially in the high humidity conditions.

All the described embodiments and advantages apply both for the use and the method according to the present invention, when applicable, even if not always explicitly stated so.

These objects are achieved by the features disclosed in the independent claims and the invention is defined by the features of the enclosed independent claims. Some preferred embodiments of the present invention are presented in the dependent claims.

Typical use according to the present invention of a surface size composition comprising at least one cellulose derivative selected from cellulose ethers, excluding carboxyalkyl celluloses, is for providing compression strength to a fibrous web, such as paper, board or the like, preferably comprising recycled cellulosic fibres.

In a typical method according to the present invention for surface sizing of a fibrous web, such as paper, board or the like, the method comprises
- obtaining a fibrous web, preferably comprising recycled cellulosic fibres, such as paper, board or the like,
- applying an aqueous surface size composition on a surface of the fibrous web in a surface sizing station or in a coating station, wherein the surface size composition comprises at least one cellulose derivative selected from cellulose ethers, excluding carboxyalkyl celluloses, and provides compression strength to the fibrous web.

DETAILED DESCRIPTION OF THE INVENTION

Figure 1:
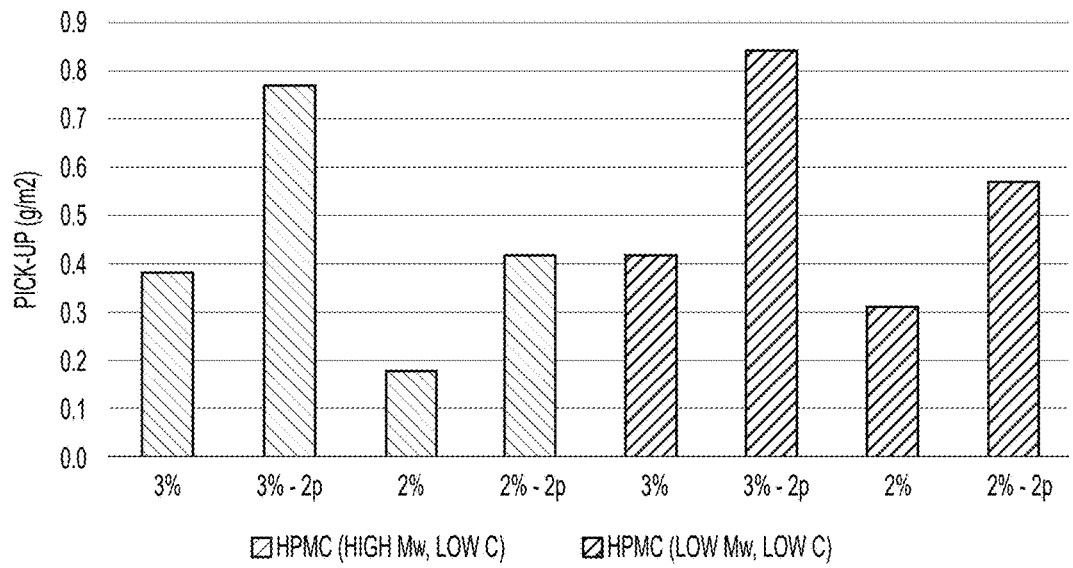
FIG. 1 shows a graph illustrating effect of molecular weight on the pick-up of the surface size according to aspects of the disclosure.

Now it has been surprisingly found out that the use of at least one cellulose derivative selected from cellulose ethers in a surface size composition provides compression strength properties for a fibrous web, such as paper, board or the like, not only at standard environmental conditions (temperature +23° C., relative humidity 50%) but also and especially at environmental conditions with high humidity and temperature (temperature +38° C., relative humidity 90%). The present invention provides a moisture-resistant and bio-based alternative which does not compete with food production to the conventionally used starch. Improved compression strength properties and moisture resistance which are obtained by using cellulose ethers provide broad field of possible end-use applications and reduce moisture-related damages of paper, board and the like in the geographical areas where the humidity levels and temperatures are high. Furthermore, the improvement of the compression strength properties may enable even lighter structures which make fibrous webs, such as board, even more sustainable package of choice.

In the present context the term "moisture resistance" is defined to be the ability of the paper, board or the like to maintain its compression strength in high humidity. Use of a cellulose derivative selected from cellulose ethers in the surface sizing composition according to the present invention provides, i.e. maintains and/or improves, the compression strength, tear strength and/or burst strength of the fibrous web, such as paper, board or the like, at standard conditions, and especially when the fibrous web is exposed to environmental conditions where relative humidity is ≥80%, preferably ≥85%, more preferably ≥90% and the temperature is ≥30° C., preferably ≥35° C., more preferably ≥38° C. Especially the compression strength, expressed as SCT strength of the paper, board or the like, and measured according to ISO 9895 standard (2008), may be improved, either when exposed to standard environmental conditions (+23° C., relative humidity 50%) and especially when exposed to environmental conditions where relative humidity is ≥80%, preferably ≥85%, more preferably ≥90% and the temperature is ≥30° C., preferably ≥35° C., more preferably ≥38° C.

The cellulose ethers suitable for use in the present invention are water-soluble, at least in cold water (+15° C.). The cellulose ether may be selected from alkyl celluloses, hydroxyalkyl celluloses, hydroxyalkyl alkyl celluloses and any of their mixtures. The cellulose ether may contain one or several alkyl and/or hydroxyalkyl groups, which may be same or different from each other. Suitable alkyl groups are, for example, methyl, ethyl and propyl. Suitable hydroxyalkyl groups are, for example, hydroxymethyl, hydroxyethyl and hydroxypropyl. The cellulose ether may have a degree of substitution, DS, of the alkyl and hydroxyalkyl groups in a range of 0.1-3, preferably 0.5-2.7, more preferably 0.7-2.5, even more preferably 1.0-2.1 or from 1.0 to less than 2.0. According to one preferable embodiment the cellulose ether is selected from a group consisting of methyl cellulose, ethyl cellulose, hydroxymethyl cellulose, hydroxyethyl cellulose, hydroxypropyl cellulose, (hydroxyethyl)methyl cellulose and (hydroxypropyl)methyl cellulose.

It is possible that the cellulose ether may even comprise other functional groups in addition to alkyl, hydroxyalkyl and hydroxyl groups. The other groups may be selected, for example, from carboxylate, carboxyalkyl, sulphonate, phosphonate, amine, amide, and alkyl ester groups. If the cellulose ether comprises one or more other groups in addition to alkyl and/or hydroxyalkyl groups, the degree of substitution of the alkyl and/or hydroxyalkyl groups is higher than the degree of substitution of the other groups.

Carboxyalkyl celluloses, such as carboxymethyl cellulose, are excluded from the scope of the present invention. The surface size composition used in the present invention is thus free of carboxyalkyl cellulose, e.g. carboxymethyl cellulose. According to one embodiment even the cellulose ether is free of carboxylate and carboxyalkyl groups as functional groups.

Cellulose backbone of the cellulose ether may originate from plant-based cellulose or microbial cellulose. Preferably the cellulose backbone of the cellulose ether originates from plant-based cellulose, more preferably wood-based cellulose.

The cellulose ether, which is suitable for use in the present invention, may have a weight average molecular weight ≤300000 g/mol, preferably ≤100000 g/mol, more preferably ≤45000 g/mol, even more preferably ≤20000 g/mol. The weight average molecular weight of the cellulose derivative may be in a range of 1000-300000 g/mol, preferably 2000-100000 g/mol, more preferably 3000-45000 g/mol or even more preferably 5000-20000 g/mol. According to one preferable embodiment the weight average molecular weight of the cellulose derivative may be in a range of 5000-18000 g/mol. Sometimes the weight average molecular weight of the cellulose derivative may be in a range of 5000-15000 g/mol. Low molecular weight of the cellulose ether may provide the surface size composition with low viscosity, which means that it is possible to increase the solids content of the surface size composition while still being able to apply the size composition with conventional application methods in a surface sizing station or in a coating station. On the other hand, use of cellulose derivative with a high molecular weight may provide higher surface sizing efficiency due to the improved ability to reinforce the inter-fibre bonding and consequently even more improve compression strength properties.

The surface size composition is preferably free of other solvents than water, especially the surface size composition is free of organic solvents, such as alcohols.

According to one preferable embodiment the viscosity of the aqueous surface size composition may be less than 2000 mPas, preferably less than 500 mPas, more preferably less than 100 mPas, even more preferably less than 50 mPas. The viscosity of the aqueous surface size composition ensures that the composition may be effectively applied on the surface of the fibrous web. In some embodiments, the aqueous surface size composition comprising cellulose ether may be applied on the fibrous web in a coating station employing any conventional coating method, such as blade, bar, roll, curtain or spray coating. In general, the aqueous surface size composition comprising the cellulose derivative selected from cellulose ethers may preferably be applied on the surface of the fibrous web in a surface sizing station comprising any conventional surface sizing apparatus, such as pond size press, film size press or gate-roll size press.

According to one embodiment the surface size composition may comprise both at least one cellulose derivative selected from cellulose ethers as described above as well as starch. In this embodiment, the viscosity of the cellulose derivative has a lesser impact on final viscosity of the surface size composition, which may enable the use of higher solids content and/or cellulose derivatives with high molecular weight.

The aqueous surface size composition may comprise at least 1 weight-%, preferably at least 2 weight-%, more preferably at least 4 weight-%, of cellulose derivative selected from cellulose ethers. According to an embodiment the surface size composition may comprise cellulose derivative 1-25 weight-%, preferably 1.5-18 weight-%, more preferably 2-14 weight-%, even more preferably 4-12 weight-%, of cellulose derivative. The percentages are calculated from the total weight of the surface size composition.

The surface size composition may comprise, in addition to cellulose ether, additives conventionally used in the surface sizing of paper, board or the like. Such additives may be selected from hydroporation agents, colorants, inorganic pigments, surfactants, plasticizers, defoamers, optical brighteners, rheology modifiers, strength additives, and aluminium compounds, and they may enhance the sizing performance of the surface size composition, and/or improve its runnability in a coating station or in a surface sizing station, such as size press, and/or otherwise adjust the surface properties of the final paper, board or the like.

The surface size composition may have a solids content of 1-30 weight-%, preferably 1-20 weight-%, more preferably 4-16 weight-%, even more preferably 7-16 weight-%, calculated from the total weight of the surface size composition. Preferably the surface size composition is free of inorganic pigments and mineral particles.

According to one embodiment the surface size composition may be applied on the surface of the fibrous web in such amount that the cellulose ether is applied on the surface of the fibrous web in amount of at least 0.25 g/m$^2$, preferably at least 0.5 g/m$^2$, more preferably at least 1 g/m$^2$. The surface size composition may be applied, for example, in such amount that the cellulose ether is applied, either on one surface of the fibrous web or both surfaces of the fibrous web, in amount in a range of 0.25-9 g/m$^2$, preferably 0.5-7 g/m$^2$, more preferably 0.65-5 g/m$^2$ or 1-3 g/m$^2$, sometimes even more preferably from more than 1 g/m$^2$ up to 3 g/m$^2$. As the cellulose ether improves the compression strength of the final paper, board or the like, it may be possible to reduce the amount of the surface size that is applied on the surface of the fibrous web, while maintaining the compression strength at the conventional level. On the other hand, it is possible to increase the amount of the surface size that is applied on the surface of the fibrous web and to increase the strength, especially compression strength, of the final paper, board or the like.

According to one preferable embodiment the method comprises at least two or three or more successive applications of the aqueous surface size composition on the surface of the fibrous web. Use of multiple successive applications of the surface size composition may allow to increase the pick-up of the composition, and thus a further improvement in strength properties can be achieved. Furthermore, the multiple application increases the degrees of freedom in relation to viscosity and/or solid content of the surface size composition.

After the application of the surface size composition on the surface of the fibrous web, the web is dried in a drying section of a paper or board machine. In case there is two, three or more successive applications of the surface size composition, the fibrous web may be dried before in-between the successive applications of the surface size composition.

The present invention is especially suitable for manufacturing processes of fibrous webs, such as paper or board, comprising recycled cellulosic fibres. According to one embodiment the fibrous web, such as paper, board or the like, on which the surface size composition is applied comprises recycled cellulosic fibres originating from old corrugated containerboard (OCC) and/or other recycled fibre material. OCC may comprise used recycled unbleached or bleached kraft pulp fibres, hardwood semi-chemical pulp fibres, grass pulp fibres or any mixture thereof. In addition to recycled fibres the fibrous web may comprise cellulosic fibres obtained by kraft pulping and/or chemi-thermomechanical pulping. According to one embodiment of the invention the fibrous web comprises at least 20 weight-%, preferably at least 50 weight-%, of recycled cellulosic fibres, for example originating from OCC and/or other recycled fibre material. In some embodiments, the fibrous web may comprise even >70 weight-%, sometimes even >80 weight-%, of recycled fibres, for example originating from OCC and/or other recycled fibre material. The amount of recycled fibres in the fibrous web may be 20-100 weight-%, preferably 55-100 weight-%, more preferably 75-95 weight-%, calculated as dry from the total weight of all fibres in the fibrous web.

The pH of the fibre stock, which is used for forming the fibrous web and which preferably comprises recycled fibres, may be ≥6, for example 6-8.

The fibrous web may further comprise inorganic mineral pigment fillers and various other additives.

According to one embodiment of the fibrous web, as dry, may have a basis weight of at least 20 g/m$^2$, preferably at least 60 g/m$^2$, more preferably at least 80 g/m$^2$, even more preferably at least 100 g/m$^2$. The basis weight of the fibrous web, as dry, may be in a range of 20-500 g/m$^2$, preferably 50-400 g/m$^2$, preferably 60-350 g/m$^2$ or sometimes even 100-200 g/m$^2$.

According to one preferable embodiment the invention is used for manufacture of the fibrous web, such as board, preferably multi-layered board, wherein the fibrous web is a layer in a multi-layered board selected from testliner, kraftliner or corrugated medium. The invention is especially suitable for surface sizing of linerboard, such as testliner comprising recycled fibres or kraftliner comprising mainly mechanical virgin pulp. Testliners may comprise a layered structure comprising from two up to four plies, and/or have a basis weight in a range of 80-350 g/m$^2$. The invention is also suitable for surface sizing of corrugated medium, especially when recycled fibres are used as raw material. Corrugated medium may have a single-ply structure. The basis weight may in a range of 110-180 g/m$^2$.

Use of surface size composition comprising cellulose derivative selected from cellulose ethers improves the strength properties of the final paper or board, such as SCT strength, tear strength and/or burst strength, especially the compression strength expressed as the SCT strength and/or RCT strength. These are important strength properties for paper and board, especially for the grades used for packaging. Short-span Compression Test (SCT) strength may be used to predict the compression resistance of the final product, e.g. cardboard box. Boxes made of containerboard are exposed to high loads while being piled in the storage and during the transportation which makes the compression strength, i.e. SCT strength, probably the most important of the strength properties. Tear strength is another important mechanical property for the linerboards. High tear strength prevents linerboard from the cracking during the creasing, bending and cutting. Burst strength indicates paper's/ board's resistance to rupturing, and it is defined as the hydrostatic pressure needed to burst a sample when the pressure is applied uniformly across the side of the sample. Ring Crush Test (RCT) strength may also be used to predict the compression resistance of the final product, i.e. the paper's/board's resistance to combined buckling and compression failure.

One use according to the present invention of at least one cellulose derivative selected from cellulose ethers, excluding carboxyalkyl celluloses, is in a surface size composition for improving strength properties and/or moisture resistance of paper, board or the like.

In one method according to the present invention for surface sizing of a fibrous web, such as paper, board or the like, an aqueous surface size composition is applied on a surface of a fibrous web, wherein the surface size composition comprises at least one cellulose derivative selected from cellulose ethers, excluding carboxyalkyl celluloses.

One embodiment relates to the use of at least one cellulose derivative selected from cellulose ethers, excluding carboxyalkyl celluloses, in a surface size composition for improving strength properties and/or moisture resistance of paper, board or the like.

EXAMPLES

Some embodiments of the invention are described in the following non-limiting examples.

Two cellulose derivatives were tested in the surface sizing of board and their effect on the compression strength was studied in both standard (RH 50%, 23° C.) and high humidity conditions (RH 90%, 38° C.).

Base Board Sheets

Non-surface sized fluting sheets were used in the tests as base board sheets. The properties of the base board sheets are given in Table 1.

TABLE 1

The properties of the base board sheets.

| Property | Value |
|---|---|
| Size (mm*mm) | 148 * 210 (A5) |
| Grammage (g/m) | 140 |
| Thickness (μm) | 231 ± 5 |
| PPS roughness, top side (μm) | 11.4 ± 0.2 |
| PPS roughness, bottom side (μm) | 12.0 ± 0.2 |
| Bendtsen roughness, top side (ml/min) | 3400 ± 500 |
| Bendtsen roughness, bottom side (ml/min) | 4200 ± 400 |

Cellulose Derivatives

Two water-soluble cellulose derivatives, methyl cellulose MC (Sigma Aldrich) and (hydroxypropyl)methyl cellulose HPMC (Sigma Aldrich), were tested. HPMC was tested with two different weight average molecular weights, 10000 and 22000 g/mol. The tested MC had a weight average molecular weight of 14000 g/mol.

The tested cellulose derivatives were soluble in cold water but insoluble in hot water, which was utilized in the sample preparation. A master batch with the highest feasible concentration was first made for each cellulose derivative and the actual surface sizing samples were prepared by diluting the master batch. The cellulose derivatives were provided in the form of dry powder. One third of the needed amount of water was first heated clearly above the gelatinization temperature of the cellulose derivative. The cellulose derivative powder was then added to the hot water (MC: >80° C., HPMC: >90° C.) and the dispersion was mixed until the powder was evenly dispersed. Thereafter, the dispersion was placed in an ice bath and the rest of the water was added, as cold tap water. The powders dissolved rapidly during the cooling. The solutions were mixed half an hour after which they were left overnight in the refrigerated room (+5° C.) to settle down.

Reference Starch

The reference starch (Raisamyl 01121, Chemigate) was cooked before it was used in the surface sizing. The starch in powder form was weighed, added into the cool tap water, and mixed until it was well dispersed. Thereafter, the heating was started. Starch started to dissolve in the temperature range of 60 to 70° C. and a yellowish liquid was formed. When the temperature reached 95° C., the starch was cooked at least for 30 to 40 minutes after which it was cooled down to the suitable sizing temperature in the heating cabin and poured into the 100 ml sample bottles. Starch with 12 wt-% solids content was used as a reference starch to indicate the compression strength that could be achieved by a common surface sizing procedure. Furthermore, 5 wt-% starch samples were prepared to provide more comparable data with the low-solids content cellulose derivatives. In addition, the effect of the solids content of starch on the pick-up and the compression strength of board was determined.

Execution of Surface Sizing Experiments

A laboratory-scale pond-type size press (Labor Sizepresse SP 5607) with gum rolls (diameter 110 mm) was used. The sizing parameters, such as the pressure and the rotation speed of the rolls, were kept constant in order to ensure the comparability of the results. The exception was the sizing temperature which was altered depending on the gelatinization temperature of the cellulose derivative tested and the retrogradation temperature of the starch. For HPMC the sizing temperature was 40° C. was, and for MC the sizing temperature was 30° C. Starch was surface sized at the temperature of approximately 65° C. in order to avoid the retrogradation of amylose fraction.

The volume of the size in the pond and the drying time in the drum dryer were maintained constant in all tests. Drum dryer was used to dry the samples after each surface sizing treatment. The speed of the drying felts was adjusted so that the sized sheets travelled in the dryer for ca 90 seconds. All sizing parameters and values for each parameter are listed in Table 2.

TABLE 2

The tested surface sizing parameters for each material.

| Surface sizing parameters | Value |
|---|---|
| Volume of the size (ml) | 100 |
| Drying time in drum dryer (s) | 90 |
| Pressure (bar) | 2 |
| Speed (m/s) | 2 |

The pick-up of the surface size on the board was evaluated by weighing the sheets before and after the surface sizing at standard conditions (RH=50%, T=23° C.). The weight difference was then calculated and divided by the surface area of the sheet. Since the surface size attaches to the both sides of the board, the pick-up was divided by two in order to obtain the pick-up per side.

In some tests the sheets were passed through the size press two or three times. In this procedure, the sheets were dried in the drum dryer between each pass.

Surface sizing of the base board multiple times with pure water was tested as reference in order to see the effect of multiple exposures to water on the compression strength of the board.

Compression Strength Measurements

Only the cross directional (CD) compression strength was measured. The length of each sample piece was the width of the A5 sample sheet (148 mm) and the sample width was 15 mm. The compression strength was measured by the short-span compression test (SCT) method using L&W Compressive strength tester (STFI). The measurements were carried out according to ISO 9895 standard (2008). Two parallel measurements were performed from all 8 sample pieces for all cellulose derivative samples, totaling 16 measurements per sample. For the base paper reference samples 8 parallel measurements were performed.

All the SCT measurements were performed in RH=50% and T=23° C. The high humidity (RH 90%) samples were also measured at the standard conditions after having been in the conditioning cabin overnight in RH=90% and T=38° C. In other words, the conditioning of the samples was performed to provide a high moisture content into the paperboard test pieces. After the conditioning, the samples were carried to the SCT apparatus in plastic pouches in order to maintain the high-humidity conditions until the actual measurement took place. It was presumed that the moisture was not able to permeate the plastic pouch and, consequently, the sample pieces were assumed to be able to lose their moisture only when being outside the pouch. Hence, the time outside the pouch was minimized and kept as constant as possible for every sample. A maximum of eight sample sets were placed in the conditioning cabin at once. All sample sets were placed in separate plastic pouches with four pieces per set.

Besides measuring the SCT values, the surface sizing performance of each cellulose derivative was evaluated also by proportioning the obtained SCT improvements to the pick-ups of the size. This so-called 'sizing efficiency' determined how much the material can provide board with compression strength when one gram per square meter per side is applied.

Results

The appearance of the surface sized samples resembled the starch-sized samples. The only visible difference was the curliness and a slightly darker tone of the sized base board sheets.

Pick-Up

The pick-up of the surface size strongly depended on the solids content of the size. The pick-up values of all the cellulose derivative solutions with 5 wt-% solids contents were close to those of 5 wt-% starch solution. This indicates a similar tendency to attach on the paperboard surface and to penetrate to the structure of the paperboard. When the sheets were passed two or three times through the size press, the pick-up remained almost constant at each pass.

The effect of the molecular weight on the obtained pick-up was studied with the two HPMC samples that had the same concentrations, but the cellulose derivative had different molecular weights. The samples with lower molecular weight resulted in higher pick-up values in all four test points. The effect of molecular weight on the pick-up of the surface size is shown in FIG. 1. It might be assumed that the lower molecular weight might enable the penetration of the cellulose derivative into smaller pores and deeper to the structure of the paper sheet.

SCT Strength in RH 50%, 23° C.

Figure 2:
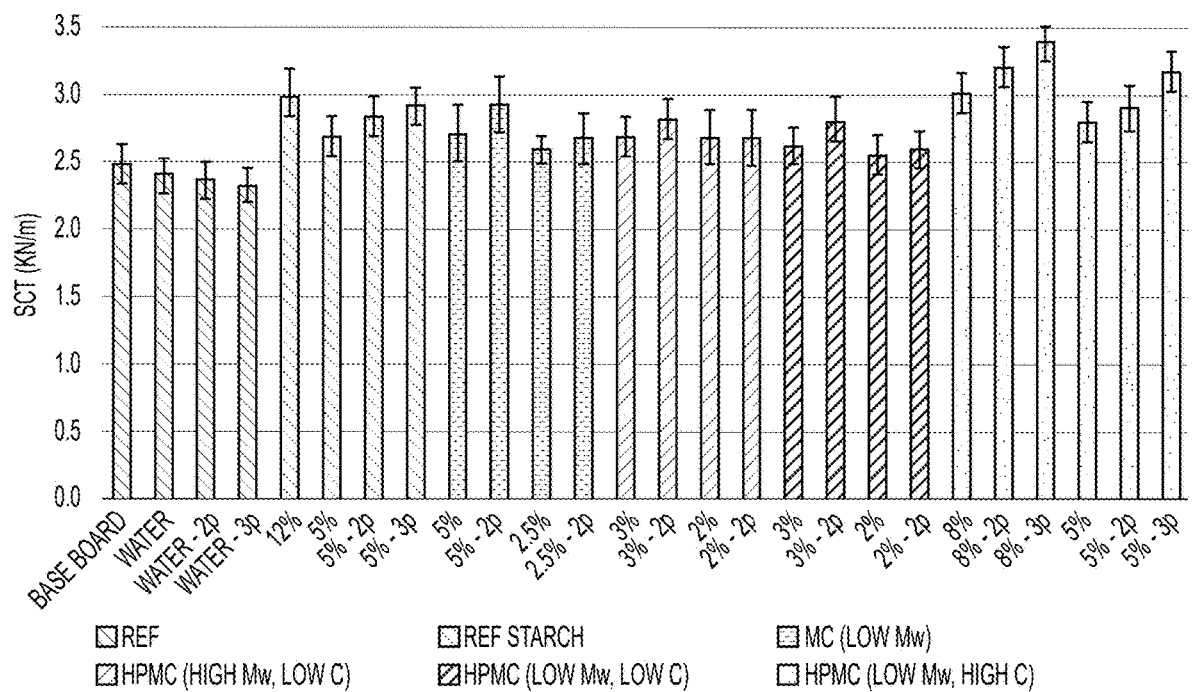
FIG. 2 shows a graph of a Short-span Compression Test (SCT) for tested cellulose derivative solutions according to aspects of the disclosure.

All the tested cellulose derivative solutions were found to improve the compression strength of the base board in RH 50%, 23° C., see FIG. 2 for results. In fact, the board sheets surface sized with 8 wt-% HPMC solution reached the SCT values, which were equal to values obtained with 12 wt-% reference starch solution, despite the lower solids content and pick-up. When the sheets were surface sized two and three times with 8 wt-% HPMC solution, even higher SCT values were obtained. In addition, the 5 wt-% MC solution improved the SCT value of the base paper in 50% relative humidity significantly.

Figure 3:
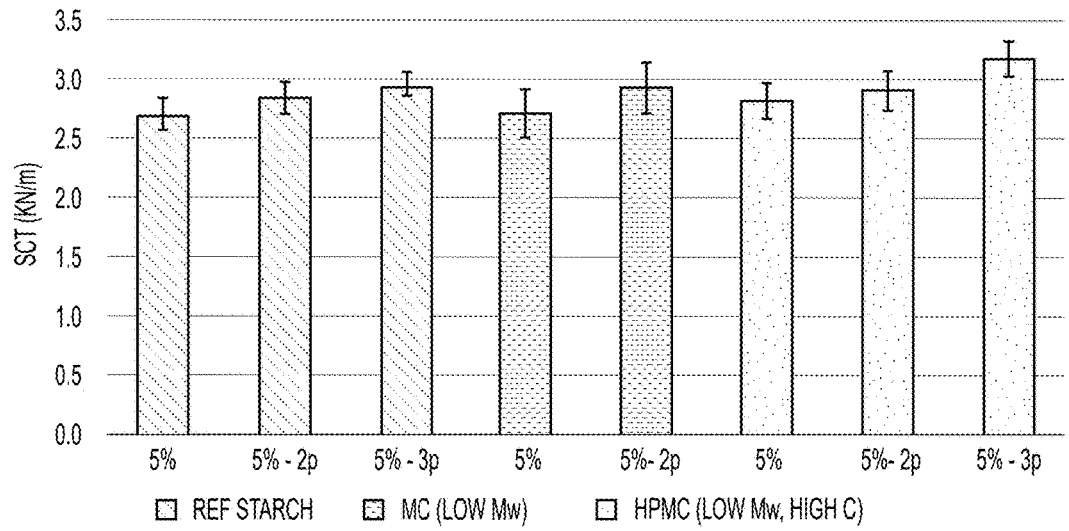
FIG. 3 shows a graph of a Short-span Compression Test (SCT) according to aspects of the disclosure.

The comparison between the 5 wt-% solutions is shown in FIG. 3. It is seen that that HPMC outperformed reference starch in all three test points. The board samples surface sized two times with MC solution expressed better compression strength than the corresponding board samples surface sized two times with starch or HPMC solution. One possible explanation for this might be the higher content of the hydrophobic functional groups in the methyl cellulose molecule. The hydrophobicity might protect the cellulose fibres of the base board from the swelling during the second exposure to the water and, hence, mitigate the declining effect in the second sizing round. The comparison between the low and high molecular weight HPMC samples indicated that the high molecular weight might impart improvement in compression strength, despite the lower pick-up and supposed lower penetration to the smallest pores of the paperboard structure.

Furthermore, it was observed that the 2 wt-% solution of high molecular weight of HPMC provided better sizing efficiency (SCT improvement/pick-up) results than the other tested combinations.

SCT Strength in RH 90%, 38° C.

Figure 4:
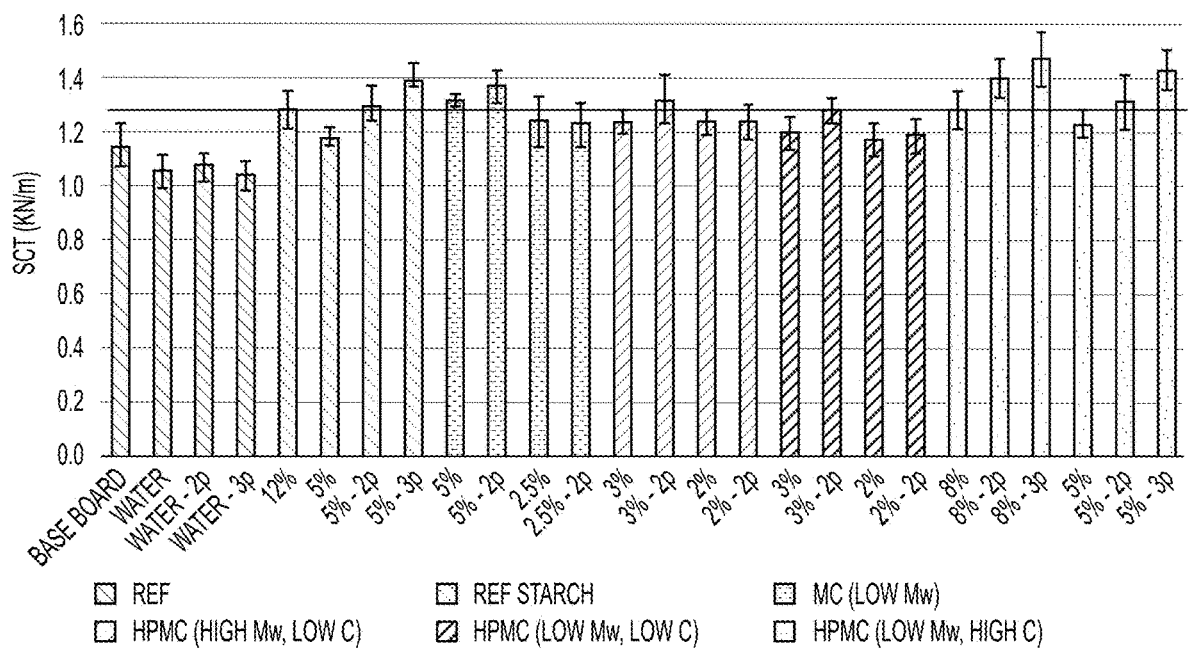
FIG. 4 shows a graph of a Short-span Compression Test (SCT) according to aspects of the disclosure.

The SCT results of the cellulose derivatives in 90% relative humidity, temperature 38° C., were even more promising than the results in RH 50%. Use of cellulose derivatives in surface sizing improved also the high-humidity compression strength of the base board sheets, results are shown in FIG. 4. The best one-pass result was achieved by 5 wt-% MC solution which outperformed both 8 wt-% HPMC solution and 12 wt-% reference starch solution. The comparison of the 5 wt-% solutions shows that the that the base board sheets surface sized twice with MC solution (two passes) also had higher compression strengths than the corresponding samples sized with starch or HPMC. The high SCT values obtained in high humidity with MC solution support the suggested theory on the role of the protective effect of the hydrophobic functional groups in MC molecules.

The comparison between the low and high molecular weight HPMC samples indicated that the high molecular weight HPMC might impart improvement in compression strength also in RH 90%.

It is concluded that the surface sizing with the aqueous surface size compositions comprising water-soluble MC and HPMC proceeded without any major difficulties, and the two cellulose derivatives were proven to provide improved compression strength for the board. Especially in high humidity conditions, the cellulose derivative samples showed better SCT strength results than samples surface sized with conventional starch.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for surface sizing of a fibrous web, the method comprising:
   obtaining a fibrous web comprising recycled cellulosic fibres and having a basis weight of at least 60 g/m$^2$; and
   increasing a compression strength of the fibrous web at environmental conditions where relative humidity is ≥80% and temperature is ≥30° C. by applying an aqueous surface size composition on a surface of the fibrous web in a surface sizing station or in a coating station in an amount of at least 0.5 g/m$^2$, wherein the surface size composition comprises at least one cellulose derivative selected from cellulose ethers, excluding carboxyalkyl celluloses.

2. The method of claim 1, wherein the aqueous surface size composition comprises at least 1 weight-% of the cellulose derivative.

3. The method according to claim 1, wherein the aqueous surface size composition further comprises starch.

4. The method according to claim 1, wherein the compression strength is Short-span Compression Test strength, measured at temperature ≥30° C. and at relative humidity ≥80%.

5. The method according to claim 1, wherein the fibrous web is a layer in a multi-layered board selected from testliner, kraftliner or corrugated medium.

6. The method according to claim 1, wherein the cellulose ether is selected from alkyl celluloses, hydroxyalkyl celluloses, hydroxyalkyl alkyl celluloses and any of their mixtures.

7. The method according to claim 6, wherein the cellulose ether is selected from a group consisting of methyl cellulose, ethyl cellulose, hydroxymethyl cellulose, hydroxyethyl cellulose, hydroxypropyl cellulose, (hydroxyethyl)methyl cellulose, and (hydroxypropyl)methyl cellulose.

8. The method according to claim 1, wherein the cellulose ether has a weight average molecular weight ≤300000 g/mol.

9. The method according to claim 1, wherein viscosity of the aqueous surface size composition is less than 2000 mPas.

10. The method according to claim 1, wherein the method comprises at least two successive applications of the aqueous surface size composition on the surface of the fibrous web.

11. The method according to claim 1, wherein the fibrous web has a basis weight of at least 80 g/m$^2$.

* * * * *